(12) United States Patent
Pywell et al.

(10) Patent No.: US 8,657,356 B2
(45) Date of Patent: Feb. 25, 2014

(54) COLLAPSIBLE BIN FOR A VEHICLE SEAT

(75) Inventors: James F. Pywell, Shelby Township, MI (US); Robert R. Kubiak, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 84 days.

(21) Appl. No.: 13/299,412

(22) Filed: Nov. 18, 2011

(65) Prior Publication Data

US 2013/0127201 A1   May 23, 2013

(51) Int. Cl.
*B60R 7/04*   (2006.01)
(52) U.S. Cl.
USPC .................................. 296/37.15; 224/275

(58) Field of Classification Search
USPC ............ 296/24.46, 37.8, 37.15, 37.16, 65.16; 224/275
See application file for complete search history.

(56) References Cited

U.S. PATENT DOCUMENTS

| | | | | | |
|---|---|---|---|---|---|
| 6,015,071 | A | * | 1/2000 | Adomeit et al. | 224/42.34 |
| 6,079,773 | A | * | 6/2000 | Hassan | 297/188.13 |
| 6,135,332 | A | * | 10/2000 | Eleam | 224/275 |
| 6,375,055 | B1 | * | 4/2002 | Spykerman et al. | 224/542 |
| 7,300,105 | B2 | * | 11/2007 | Jasinski et al. | 297/188.04 |
| 7,611,183 | B2 | * | 11/2009 | Burkey et al. | 296/37.15 |

* cited by examiner

*Primary Examiner* — Jason S Morrow
*Assistant Examiner* — E Turner Hicks
(74) *Attorney, Agent, or Firm* — Quinn Law Group, PLLC

(57) ABSTRACT

A seating system for a vehicle includes a first seat configured for supporting a driver of the vehicle and a second seat disposed adjacent the first seat and configured for supporting a passenger of the vehicle. The second seat includes a collapsible bin configured for storing one or more articles.

19 Claims, 3 Drawing Sheets

COLLAPSIBLE BIN FOR A VEHICLE SEAT

TECHNICAL FIELD

The present disclosure generally relates to vehicles, and more specifically, to a seating system for a vehicle.

BACKGROUND

Vehicles transport occupants and cargo between locations. For example, a vehicle may transport a driver and/or one or more passengers, and articles such as grocery bags, packages, and luggage. Such articles may be segregated from the driver by placing the articles in an area of the vehicle that is out of the reach of the driver, e.g., a trunk of the vehicle. However, articles may also be transported within the passenger compartment of the vehicle.

SUMMARY

A seating system for a vehicle includes a first seat configured for supporting a driver of the vehicle and a second seat disposed adjacent the first seat and configured for supporting a passenger of the vehicle. The second seat includes a collapsible bin configured for storing one or more articles.

In one embodiment, the second seat includes a seat back having a back panel, wherein the seat back is pivotable to a folded position such that the back panel is disposed substantially parallel to a floor of the vehicle. In addition, the collapsible bin is configured for storing one or more articles adjacent the driver and includes a first wall, a second wall positionable opposite the first wall, two elastic partitions each interconnecting the first wall and the second wall and spaced opposite and apart from one another, and two rails each attached to the back panel and disposed substantially parallel to one another. The collapsible bin is transitionable between an unfolded position such that the collapsible bin defines a cavity configured for storing the one or more articles, and a stowed position such that the collapsible bin is disposed substantially flat against the back panel and does not define the cavity. The collapsible bin is only transitionable to the unfolded position when the seat back is disposed in the folded position. Further, each of the first wall and the second wall projects away from the seat back so as to be disposed substantially perpendicular to the back panel when the collapsible bin is disposed in the unfolded position, and each of the first wall and the second wall is disposed substantially parallel to the back panel when the collapsible bin is disposed in the stowed position.

A vehicle includes a front row of occupant seating. The front row includes the seating system for the vehicle. The seating system includes the first seat configured for supporting the driver of the vehicle, and the second seat disposed adjacent the first seat within a plane that is disposed substantially perpendicular to a direction of vehicle travel. The second seat is configured for supporting the passenger of the vehicle and includes the seat back and the collapsible bin configured for storing one or more articles. The seat back has the back panel and is pivotable to the folded position such that the back panel is disposed substantially parallel to the floor of the vehicle. The collapsible bin includes the first wall, the second wall positionable opposite the first wall, two elastic partitions each interconnecting the first wall and the second wall and spaced opposite and apart from one another, two rails, and a locking mechanism. The two rails are each attached to the back panel, disposed substantially parallel to one another, and pivotably connected to each of the first wall and the second wall. The locking mechanism is configured for releasably locking one of the first wall and the second wall into a locked position so that the one of the first wall and the second wall is disposed substantially perpendicular to the back panel. Further, the collapsible bin is transitionable between the unfolded position such that the collapsible bin defines the cavity configured for storing the one or more articles, and the stowed position such that the collapsible bin is disposed substantially flat against the back panel and does not define the cavity. Each of the first wall and the second wall projects away from the seat back so as to be disposed substantially perpendicular to the back panel when the collapsible bin is disposed in the unfolded position. Further, the first wall is sandwiched between the second wall and the back panel, the two elastic partitions are each sandwiched between the first wall and the back panel, and each of the first wall and the second wall is disposed substantially parallel to the back panel when the collapsible bin is disposed in the stowed position.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

DETAILED DESCRIPTION

Figure 1:
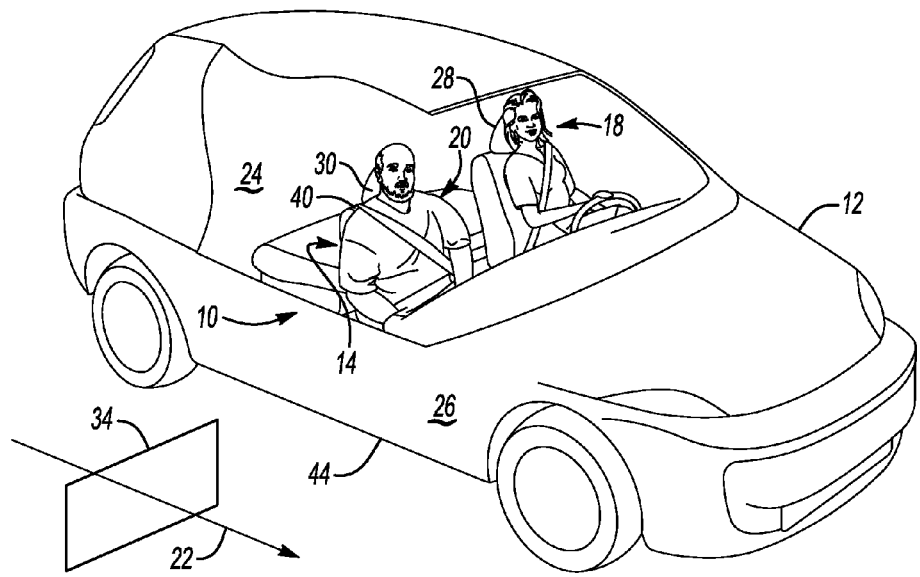
FIG. 1 is a schematic fragmentary perspective illustration of a seating system for a vehicle, wherein the seating system includes a first seat and a second seat having a collapsible bin.
Figure 2A:
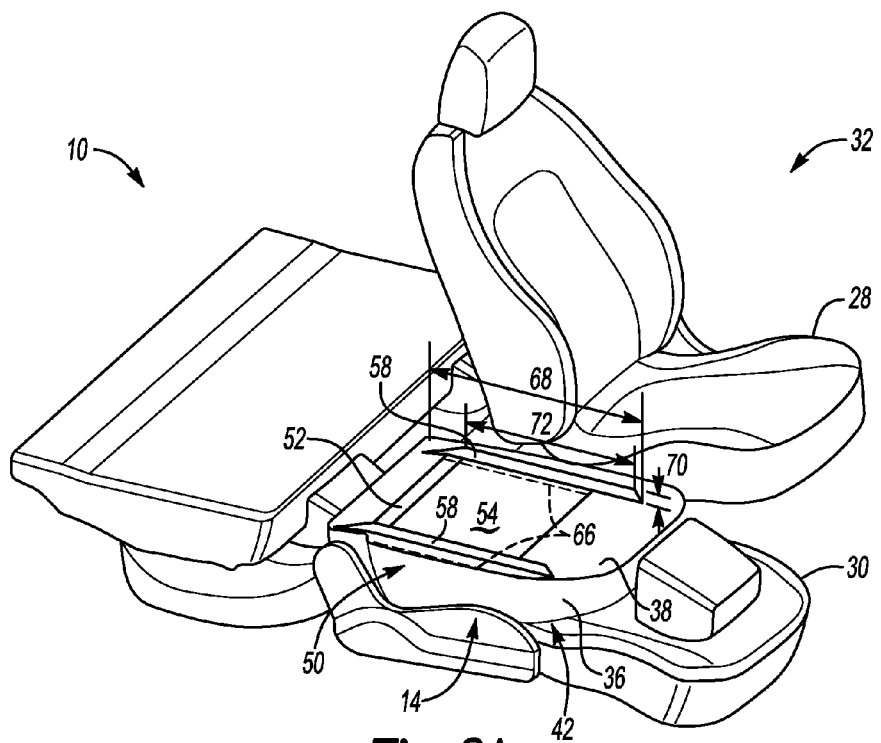
FIG. 2A is a schematic perspective illustration of the collapsible bin of FIG. 1 disposed in a stowed position.
Figure 2B:
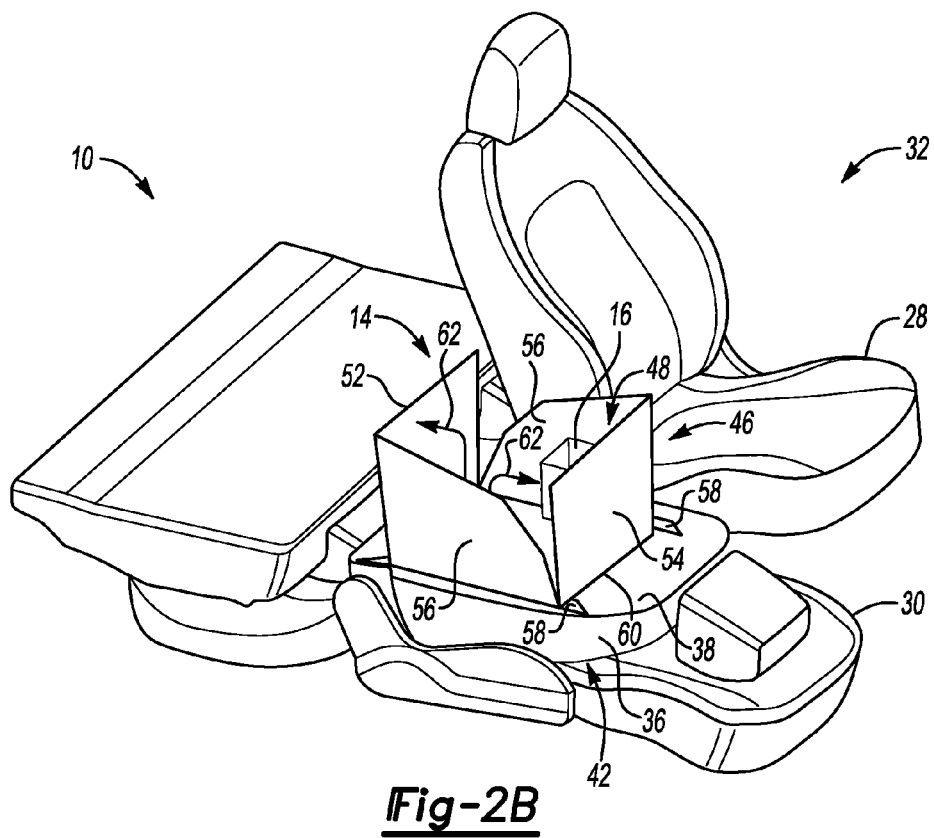
FIG. 2B is a schematic perspective illustration of the collapsible bin of FIGS. 1 and 2A disposed in an unfolded position.
Figure 3:
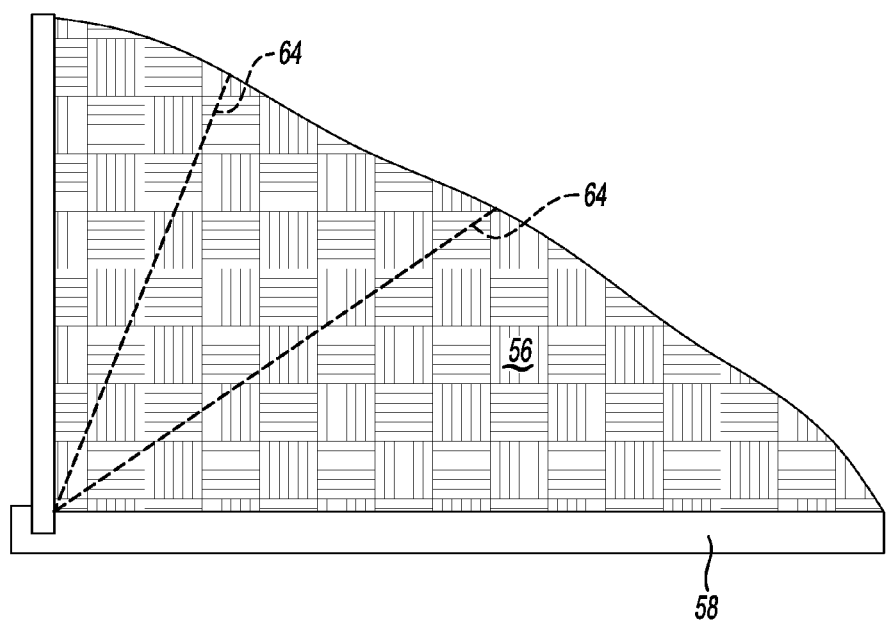
FIG. 3 is a schematic fragmentary illustration of a side view of a portion of the collapsible bin of FIGS. 1-2B.

Referring to the Figures, wherein like reference numerals refer to like elements, a seating system 10 for a vehicle 12 is shown generally in FIG. 1. More specifically, as best shown in FIGS. 2A and 2B, the seating system 10 includes a collapsible bin 14 configured for storing one or more articles 16 (FIG. 2B). As such, the vehicle 12 and seating system 10 may be useful for transporting a driver 18 (FIG. 1), one or more passengers 20 (FIG. 1), and/or one or more articles 16 (FIG. 2B) so that the one or more articles 16 are easily accessible by the driver 18, as set forth in more detail below.

Directional terminology used herein pertaining to the vehicle 12 is understood by one skilled in the art. For example, terminology such as "front", "forward", and "fore" generally refers to a leading portion of the vehicle 12 with respect to a direction of vehicle travel (indicated generally by arrow 22 in FIG. 1). Likewise, terminology such as "rear", "rearward", "back", and "aft" generally refers to a trailing portion of the vehicle 12 with respect to the direction of vehicle travel 22. As shown in FIG. 1, the vehicle 12 defines an interior passenger compartment (shown generally at 24), and components not disposed within the passenger compartment 24 are generally referenced as an exterior body 26 of the vehicle 12.

Referring now to FIGS. 1-2B, the seating system 10 includes a first seat 28 configured for supporting the driver 18 of the vehicle 12, and a second seat 30 disposed adjacent the first seat 28 and configured for supporting the passenger 20 of the vehicle 12. That is, the vehicle 12 includes a front row 32 (FIGS. 2A and 2B) of occupant seating, and the front row 32 includes the seating system 10. More specifically, the second seat 30 of the seating system 10 is disposed adjacent the first seat 28 within a plane 34 (FIG. 1) disposed substantially perpendicular to the direction of vehicle travel 22. Stated differently, the first seat 28 may be generally described as the driver's seat of the vehicle 12 and the second seat 30 may be generally described as the front passenger seat of the vehicle 12.

As best shown in FIGS. 2A and 2B, the second seat 30 includes a seat back 36 having a back panel 38. The back panel 38 may be generally disposed opposite and away from the seated passenger 20 (FIG. 1), or a front portion 40 (FIG. 1) of the seat back 36 that is configured for supporting the passenger 20. That is, the back panel 38 may face a rear of the passenger compartment 24 (FIG. 1) of the vehicle 12. Further, the seat back 36 may be pivotable to a folded position (denoted generally at 42 in FIGS. 2A and 2B) such that the back panel 38 is disposed substantially parallel to a floor 44 (FIG. 1) of the vehicle 12. That is, the second seat 30 may be a foldable seat and may be characterized as a "dump latch" or "flip and fold" style seat.

With continued reference to FIGS. 2A and 2B, the second seat 30 includes a collapsible bin 14 configured for storing the one or more articles 16 (FIG. 2B). More specifically, the collapsible bin 14 may be configured for storing or containing the one or more articles 16 adjacent the driver 18 (FIG. 1), i.e., within a normal reach of the driver 18. For example, the one or more articles 16 may be cargo such as, but not limited to, grocery bags, packages, computers, personal data assistants, maps, purses, wallets, luggage, containers, and the like. As best shown in FIGS. 2A and 2B, the collapsible bin 14 may be attached to the back panel 38 of the seat back 36, as set forth in more detail below.

Further, as best described by comparing FIGS. 2A and 2B, the collapsible bin 14 may be transitionable between an unfolded position (shown generally at 46 in FIG. 2B) such that collapsible bin 14 defines a cavity 48 (FIG. 2B) configured for storing the one or more articles 16, and a stowed position (shown generally at 50 in FIG. 2A) such that the collapsible bin 14 is disposed substantially flat against the back panel 38 and does not define the cavity 48. That is, the collapsible bin 14 is collapsed or flattened against the back panel 38 when disposed in the stowed position 50 of FIG. 2A. Further, the collapsible bin 14 may only be transitionable to the unfolded position 46 of FIG. 2B when the seat back 36 is disposed in the folded position 42. That is, the collapsible bin 14 may not be transitionable to the unfolded position 46 when the passenger 20 (FIG. 1) is seated in the second seat 30.

As described with reference to FIG. 2B, the collapsible bin 14 may include a first wall 52 and a second wall 54 positionable opposite the first wall 52. The collapsible bin 14 may also include two elastic partitions 56 each interconnecting the first wall 52 and the second wall 54 and spaced opposite and apart from one another. Each of the first wall 52 and the second wall 54 may be formed from a rigid material, e.g., a plastic, and each of the two elastic partitions 56 may be formed from a resilient material, e.g., a mesh or netting. Therefore, each of the first wall 52 and the second wall 54 may be configured as a hard-sided flap, and each of the two elastic partitions 56 may be configured as a soft-sided divider. Therefore, the collapsible bin 14 may be configured as a box or container having at least two rigid sides when disposed in the unfolded position 46.

More specifically, with continued reference to FIG. 2B, each of the first wall 52 and the second wall 54 may project away from the seat back 36 so as to be disposed substantially perpendicular to the back panel 38 when the collapsible bin 14 is disposed in the unfolded position 46. That is, each of the first wall 52 and the second wall 54 may stand upright with respect to the back panel 38 and may be interconnected by the two elastic partitions 56. As such, when disposed in the unfolded position 46, the collapsible bin 14 may form a box-like container or receptacle that defines the cavity 48 configured for storing the one or more articles 16.

Conversely, as best shown in FIG. 2A, each of the first wall 52 and the second wall 54 may be disposed substantially parallel to the back panel 38 when the collapsible bin 14 is disposed in the stowed position 50. That is, when disposed in the stowed position 50, e.g., when the one or more articles 16 (FIG. 2B) have been removed from the cavity 48, the collapsible bin 14 may flatten against the back panel 38 so as to no longer define the cavity 48. Stated differently, the collapsible bin 14 may collapse or fold in on itself when disposed in the stowed position 50.

Referring now to FIGS. 2A-4, the collapsible bin 14 may further include two rails 58 each attached to the back panel 38 (FIGS. 2A and 2B) and disposed substantially parallel to one another. The two rails 58 may be formed from any suitable material, such as, but not limited to, plastic, metal, and combinations thereof. Further, each of the two rails 58 may be attached to the back panel 38 in any suitable manner. For example, the two rails 58 may be spaced apart from one another and riveted, screwed, and/or adhered to the back panel 38.

As best shown in FIGS. 2A and 2B, each of the first wall 52 and the second wall 54 may be pivotably connected to both of the two rails 58. That is, each of the first wall 52 and the second wall 54 may be disposed between and connected to each of the two rails 58, and may pivot with respect to the two rails 58 along an axis 60 (FIGS. 2B and 4) that is substantially perpendicular to each of the two rails 58. Therefore, as denoted generally by arrows 62 in FIG. 2B, the first wall 52 and the second wall 54 may pivot and transition between a folded-flat position (shown generally in FIG. 2A) in which the first and second walls 52, 54 are disposed substantially parallel to the back panel 38, and an upright position (shown generally in FIG. 2B) in which the first and second walls 52, 54 are disposed substantially perpendicular to the back panel 38.

Therefore, for example, as shown generally in FIG. 2A, the first wall 52 may be sandwiched between the second wall 54 and the back panel 38 when the collapsible bin 14 is disposed in the stowed position 50. That is, the second wall 54 may be folded onto the first wall 52. Further, the two elastic partitions 56 (FIG. 2B) may each be sandwiched between the first wall 52 and the back panel 38 when the collapsible bin 14 is disposed in the stowed position 50. That is, the first wall 52 may be folded onto the two elastic partitions 56. For example, the two elastic partitions 56 may each define fold lines or creases 64 (FIG. 3) and may elastically contract so as to be folded underneath the first wall 52 when the collapsible bin 14 is disposed in the stowed position 50.

Alternatively, although not shown, the second wall 54 may be sandwiched between the first wall 52 and the back panel 38 when the collapsible bin 14 is disposed in the stowed position 50 so that the first wall 52 is folded onto the second wall 54. As such, the two elastic partitions 56 may each be sandwiched between the second wall 54 and the back panel 38 when the collapsible bin 14 is disposed in the stowed position 50 so that the first wall 52 is folded onto the second wall 54, and the two elastic partitions 56 are sandwiched between the second wall 54 and the back panel 38.

In addition, referring to FIG. 2A, in another embodiment, the back panel 38 may define two recessions 66 therein. Each of the two elastic partitions 56 may recede into a respective one of the two recessions 66 when the collapsible bin 14 is disposed in the stowed position 50, and may be elastically drawn from the respective one of the two recessions 66 when the collapsible bin 14 is disposed in the unfolded position 46 (FIG. 2B).

Further, with continued reference to FIG. 2A, each of the two rails 58 may have a length 68 and may protrude from the back panel 38 to a height 70 of from about 15 mm to about 35 mm, e.g., about 25 mm, along at least a portion 72 of the length 68. That is, the two rails 58 may not be disposed flush with the back panel 38, but may rather protrude or project from the back panel 38. As such, the first wall 52 and the second wall 54 may fold within the two rails 58 as described above when the collapsible bin 14 is disposed in the stowed position 50 so that the two rails 58 may protect the first and second walls 52, 54 and the two elastic partitions 56 from, for example, sliding cargo. That is, the two rails 58 may provide an elevated surface upon which other vehicular cargo may slide. For example, cargo such as a sheet of plywood (not shown) or large luggage (not shown) may slide along the two rails 58 so as not to damage or interfere with the collapsible bin 14 when the collapsible bin 14 is disposed in the stowed position 50. Therefore, the collapsible bin 14 is retractable and allows for a generally-flat cargo load floor when the collapsible bin 14 is disposed in the stowed position 50.

Figure 4:
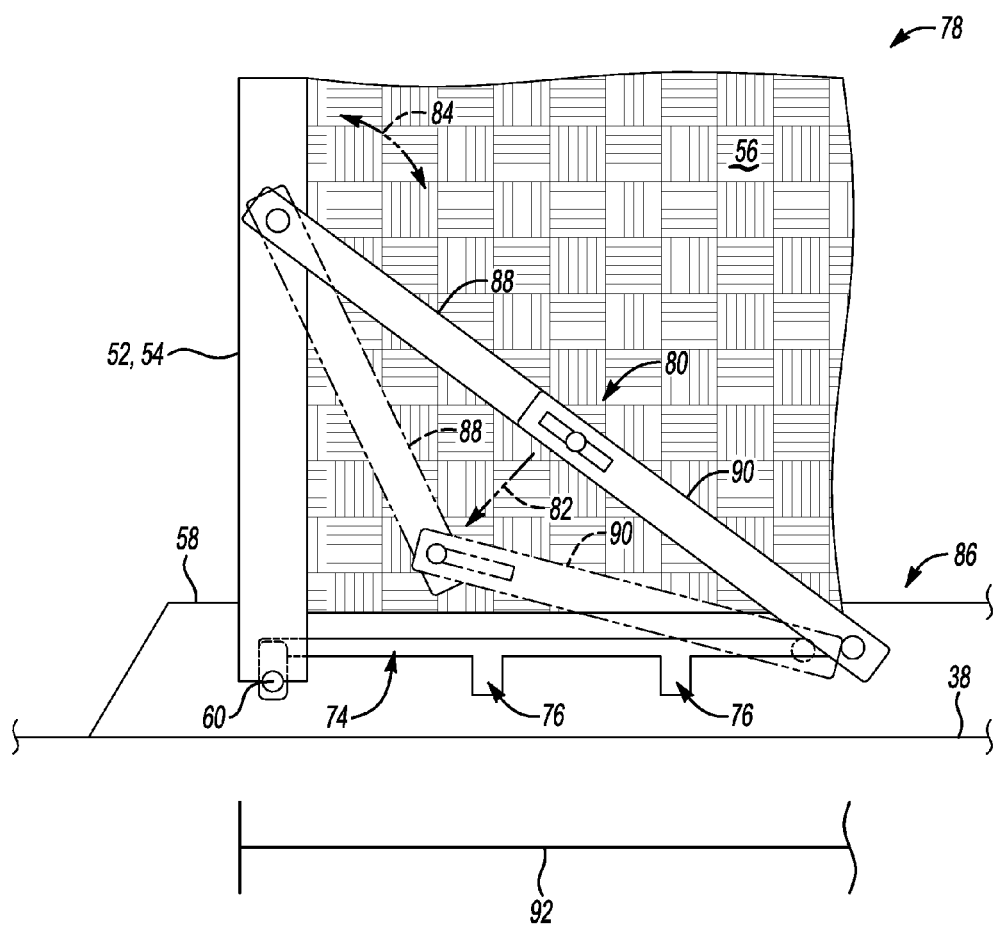
FIG. 4 is a schematic fragmentary illustration of a side view of a locking mechanism of the collapsible bin of FIGS. 1-3.

Referring now to FIG. 4, each of the two rails 58 may define a channel 74 therein along at least the portion 72 (FIG. 2A) of the length 68 (FIG. 2A) of the rail 58. In addition, as set forth in more detail below, each of the two rails 58 may define a plurality of notches 76 therein each connected with the channel 74.

With continued reference to FIG. 4, the collapsible bin 14 may further include a locking mechanism 78 configured for releasably locking one of the first wall 52 and the second wall 54 into a locked position (shown generally at 80 in FIG. 4) so that the one of the first wall 52 and the second wall 54 is disposed substantially perpendicular to the back panel 38. That is, the locking mechanism 78 may transition between the locked position 80 so that the first wall 52 or second wall 54 is immovable or locked after pivoting away from the back panel 38, and an open position (shown generally at 82 in FIG. 4) so that the first wall 52 or second wall 54 is moveable or pivotable away from or toward the back panel 38 in the direction of arrows 84.

Although the locking mechanism 78 may have any arrangement or form, in one non-limiting example as described with reference to FIG. 4, the locking mechanism 78 may include a hinge 86 slideable along one of the two rails 58. For example, the hinge 86 may include a first bar 88 pivotably attached to either of the first wall 52 and the second wall 54, and a second bar 90 pivotably attached to the first bar 88 and one of the two rails 58, wherein the second bar 90 is slideable within the channel 74. In addition, although not shown, the collapsible bin 14 may include a plurality of locking mechanisms 78, e.g., one locking mechanism 78 for the first wall 52 and one locking mechanism 78 for the second wall 54.

In operation, the first wall 52 may be inserted into one of the plurality of notches 76. Similarly, the second wall 54 may be inserted into another one of the plurality of notches 76 at an opposite end of the two rails 58. An operator, e.g., the driver 18, may then pull each of the first wall 52 and the second wall 54 up and away from the back panel 38, e.g., in the direction of arrows 62 in FIG. 2B, so as to transition the collapsible bin 14 to the unfolded position 46 (FIG. 2B). More specifically, as the first wall 52 or second wall 54 transitions from being disposed substantially parallel to the back panel 38 when the collapsible bin 14 is disposed in the stowed position 50 (FIG. 2A), to substantially perpendicular to the back panel 38 when the collapsible bin 14 is disposed in the unfolded position 46 (FIG. 2B), the hinge 86 may slide within the channel 74 until the first bar 88 and the second bar 90 engage and lock to one another within the same plane, as shown in FIG. 4. To then stow the collapsible bin 14, the operator may push down upon the first wall 52 and the second wall 54 to unlock the locking mechanism 78 and thereby fold the first wall 52 and the second wall 54 flat against the back panel 38.

In addition, for the embodiment including the plurality of notches 76, the first wall 52 may be insertable into any one of the plurality of notches 76 to thereby vary a dimension 92 (FIG. 4), e.g., a length, of the cavity 48 (FIG. 2B) when the collapsible bin 14 is disposed in the unfolded position 46 (FIG. 2B). Therefore, the size of the collapsible bin 14 may be customizable to accommodate both comparatively large and small articles 16 (FIG. 2B) within reach of the driver 18 (FIG. 1).

Accordingly, as described with reference to the Figures, the vehicle 12 set forth herein includes the front row 32 (FIG. 2A) of occupant seating, as set forth above. The front row 32 includes the seating system 10, which includes the first seat 28 configured for supporting the driver 18 (FIG. 1) of the vehicle 12, and the second seat 30 disposed adjacent the first seat 28. More specifically, the second seat 30 is disposed adjacent the first seat 28 within the plane 34 (FIG. 1) that is disposed substantially perpendicular to the direction of vehicle travel 22 (FIG. 1), and is configured for supporting the passenger 20 (FIG. 1) of the vehicle 12. The second seat 30 includes the seat back 36 and the collapsible bin 14.

For the vehicle 12 of FIG. 1, the seat back 36 has the back panel 38, wherein the seat back 36 is pivotable to the folded position 42 (FIGS. 2A and 2B) such that the back panel 38 is disposed substantially parallel to the floor 44 (FIG. 1) of the vehicle 12. Further, the collapsible bin 14 is configured for storing the one or more articles 16 (FIG. 2B), e.g., within reach of the driver 18 (FIG. 1), and includes the first wall 52, the second wall 54 positionable opposite the first wall 52, two elastic partitions 56 each interconnecting the first wall 52 and the second wall 54 and spaced opposite and apart from one another, two rails 58 (FIG. 2A), and the locking mechanism 78 (FIG. 4). The two rails 58 are each attached to the back panel 38, disposed substantially parallel to one another, and are pivotably connected to each of the first wall 52 and the second wall 54. As set forth above, the locking mechanism 78 is configured for releasably locking one of the first wall 52 and the second wall 54 into the locked position 80 (FIG. 4) so that the one of the first wall 52 and the second wall 54 is disposed substantially perpendicular to the back panel 38.

For the vehicle 12, the collapsible bin 14 is transitionable between the unfolded position 46 (FIG. 2B) such that the collapsible bin 14 defines the cavity 48 (FIG. 2B) configured for storing the one or more articles 16 (FIG. 2B), e.g., adjacent to and within reach of the driver 18 (FIG. 1), and the stowed position 50 (FIG. 2A) such that the collapsible bin 14 is disposed substantially flat against the back panel 38 and does not define the cavity 48. Each of the first wall 52 and the second wall 54 projects away from the seat back 36 so as to be disposed substantially perpendicular to the back panel 38 when the collapsible bin 14 is disposed in the unfolded position 46 of FIG. 2B. In addition, the first wall 52 is sandwiched between the second wall 54 and the back panel 38, the two elastic partitions 56 are each sandwiched between the first wall 52 and the back panel 38, and each of the first wall 52 and the second wall 54 is disposed substantially parallel to the back panel 38 when the collapsible bin 14 is disposed in the stowed position 50 of FIG. 2A.

Therefore, the seating system 10 and vehicle 12 allow for convenient access to articles 16 by the driver 18 when the collapsible bin 14 is disposed in the unfolded position 46. That is, the collapsible bin 14 provides a receptacle within the vehicle 12 adjacent to and within reach of the driver 18 for convenient placement, access to, observation of, and/or removal of articles 16 such as, for example, grocery bags, packages, purses, wallets, and the like. Further, the collapsible bin 14 organizes articles 16 within reach of the driver 18 and confines the articles 16 during vehicle travel. In addition, the collapsible bin 14 folds substantially flat against the back panel 38 of the second seat 30 when the collapsible bin 14 is disposed in the stowed position 50, and as such, allows for other cargo to be placed on top of the collapsible bin 14 when the collapsible bin 14 is not in use.

While the best modes for carrying out the disclosure have been described in detail, those familiar with the art to which this disclosure relates will recognize various alternative designs and embodiments for practicing the disclosure within the scope of the appended claims.

The invention claimed is:

1. A seating system for a vehicle, the seating system comprising:
   a first seat configured for supporting a driver of the vehicle; and
   a second seat disposed adjacent the first seat and configured for supporting a passenger of the vehicle, the second seat including a collapsible bin configured for storing one or more articles;
   wherein the second seat includes a seat back having a back panel, and further wherein the seat back is pivotable to a folded position such that the back panel is disposed substantially parallel to a floor of the vehicle;
   wherein the collapsible bin is transitionable between an unfolded position such that the collapsible bin defines a cavity configured for storing the one or more articles, and a stowed position such that the collapsible bin is disposed substantially flat against the back panel and does not define the cavity;
   wherein the collapsible bin includes:
      a first wall;
      a second wall positionable opposite the first wall; and
      two elastic partitions each interconnecting the first wall and the second wall and spaced opposite and apart from one another;
      wherein each of the first wall and the second wall projects away from the seat back so as to be disposed substantially perpendicular to the back panel when the collapsible bin is disposed in the unfolded position, and wherein each of the first wall and the second wall is disposed substantially parallel to the back panel when the collapsible bin is disposed in the stowed position;
   wherein the first wall is sandwiched between the second wall and the back panel when the collapsible bin is disposed in the stowed position.

2. The seating system of claim 1, wherein the two elastic partitions are each sandwiched between the first wall and the back panel when the collapsible bin is disposed in the stowed position.

3. The seating system of claim 1, wherein the back panel defines two recessions therein, and further wherein each of the two elastic partitions recedes into a respective one of the two recessions when the collapsible bin is disposed in the stowed position, and is elastically drawn from the respective one of the two recessions when the collapsible bin is disposed in the unfolded position.

4. A seating system for a vehicle, the seating system comprising:
   a first seat configured for supporting a driver of the vehicle; and
   a second seat disposed adjacent the first seat and configured for supporting a passenger of the vehicle, the second seat including a collapsible bin configured for storing one or more articles;
   wherein the second seat includes a seat back having a back panel, and further wherein the seat back is pivotable to a folded position such that the back panel is disposed substantially parallel to a floor of the vehicle;
   wherein the collapsible bin is transitionable between an unfolded position such that the collapsible bin defines a cavity configured for storing the one or more articles, and a stowed position such that the collapsible bin is disposed substantially flat against the back panel and does not define the cavity;
   wherein the collapsible bin includes:
      a first wall;
      a second wall positionable opposite the first wall; and
      two elastic partitions each interconnecting the first wall and the second wall and spaced opposite and apart from one another;
      wherein each of the first wall and the second wall projects away from the seat back so as to be disposed substantially perpendicular to the back panel when the collapsible bin is disposed in the unfolded position, and wherein each of the first wall and the second wall is disposed substantially parallel to the back panel when the collapsible bin is disposed in the stowed position;
   wherein the collapsible bin further includes two rails each attached to the back panel and disposed substantially parallel to one another;
   wherein each of the two rails has a length and protrudes from the back panel to a height of from about 15 mm to about 35 mm along at least a portion of the length.

5. A vehicle comprising:
   a front row of occupant seating including a seating system for the vehicle, wherein the seating system includes:
      a first seat configured for supporting a driver of the vehicle; and
      a second seat disposed adjacent the first seat within a plane that is disposed substantially perpendicular to a direction of vehicle travel, wherein the second seat is configured for supporting a passenger of the vehicle and includes:
         a seat back having a back panel, wherein the seat back is pivotable to a folded position such that the back panel is disposed substantially parallel to a floor of the vehicle; and
         a collapsible bin configured for storing one or more articles, the collapsible bin including:
            a first wall;
            a second wall positionable opposite the first wall;

two elastic partitions each interconnecting the first wall and the second wall and spaced opposite and apart from one another;

two rails each attached to the back panel, disposed substantially parallel to one another, and pivotably connected to each of the first wall and the second wall; and a locking mechanism configured for releasably locking one of the first wall and the second wall into a locked position so that the one of the first wall and the second wall is disposed substantially perpendicular to the back panel;

wherein the collapsible bin is transitionable between an unfolded position such that the collapsible bin defines a cavity configured for storing the one or more articles, and a stowed position such that the collapsible bin is disposed substantially flat against the back panel and does not define the cavity;

wherein each of the first wall and the second wall projects away from the seat back so as to be disposed substantially perpendicular to the back panel when the collapsible bin is disposed in the unfolded position;

wherein the first wall is sandwiched between the second wall and the back panel, the two elastic partitions are each sandwiched between the first wall and the back panel, and each of the first wall and the second wall is disposed substantially parallel to the back panel when the collapsible bin is disposed in the stowed position.

6. The vehicle of claim 5, wherein each of the first wall and the second wall is formed from a rigid material and each of the two elastic partitions is formed from a resilient material.

7. The seating system of claim 1, wherein the collapsible bin further includes two rails each attached to the back panel and disposed substantially parallel to one another.

8. The seating system of claim 4, wherein the two elastic partitions are each sandwiched between the first wall and the back panel when the collapsible bin is disposed in the stowed position.

9. The seating system of claim 8, wherein the back panel defines two recessions therein, and further wherein each of the two elastic partitions recedes into a respective one of the two recessions when the collapsible bin is disposed in the stowed position, and is elastically drawn from the respective one of the two recessions when the collapsible bin is disposed in the unfolded position.

10. The seating system of claim 4, wherein the back panel defines two recessions therein, and further wherein each of the two elastic partitions recedes into a respective one of the two recessions when the collapsible bin is disposed in the stowed position, and is elastically drawn from the respective one of the two recessions when the collapsible bin is disposed in the unfolded position.

11. The seating system of claim 4, wherein each of the first wall and the second wall is pivotably connected to both of the two rails.

12. The seating system of claim 11, wherein the collapsible bin further includes a locking mechanism configured for releasably locking one of the first wall and the second wall into a locked position so that the one of the first wall and the second wall is disposed substantially perpendicular to the back panel.

13. The seating system of claim 12, wherein the locking mechanism includes a hinge slideable along one of the two rails.

14. The seating system of claim 13, wherein each of the two rails has a length and defines a channel therein along at least a portion of the length.

15. The seating system of claim 14, wherein the hinge includes:
a first bar pivotably attached to either of the first wall and the second wall; and
a second bar pivotably attached to the first bar and one of the two rails, wherein the second bar is slideable within the channel.

16. The seating system of claim 7, wherein each of the two rails has a length and defines:
a channel therein along at least a portion of the length; and
a plurality of notches therein each connected with the channel.

17. The seating system of claim 16, wherein the first wall is insertable into any one of the plurality of notches to thereby vary a dimension of the cavity when the collapsible bin is disposed in the unfolded position.

18. The seating system of claim 4, wherein each of the two rails has a length and defines:
a channel therein along at least a portion of the length; and
a plurality of notches therein each connected with the channel.

19. The seating system of claim 18, wherein the first wall is insertable into any one of the plurality of notches to thereby vary a dimension of the cavity when the collapsible bin is disposed in the unfolded position.

* * * * *